US012571881B2

(12) United States Patent
Bertacchini et al.

(10) Patent No.: US 12,571,881 B2
(45) Date of Patent: Mar. 10, 2026

(54) TARGET DETECTION IN WORLD REFERENCE SYSTEM

(71) Applicant: Inxpect S.p.A., Brescia (IT)

(72) Inventors: Ugo Bertacchini, Brescia (IT); Michele Belotti Cassa, Brescia (IT); Rakefet Weidenfeld, Brescia (IT); Sagi Sheer, Brescia (IT)

(73) Assignee: Inxpect S.p.A., Brescia BS (IT)

( * ) Notice: Subject to any disclaimer, the term of this patent is extended or adjusted under 35 U.S.C. 154(b) by 292 days.

(21) Appl. No.: 18/223,116

(22) Filed: Jul. 18, 2023

(65) Prior Publication Data

US 2024/0027579 A1 Jan. 25, 2024

(30) Foreign Application Priority Data

Jul. 21, 2022 (EP) ...................................... 22186323

(51) Int. Cl.
 *G01S 7/40* (2006.01)
 *G01S 13/42* (2006.01)
 *G01S 13/86* (2006.01)

(52) U.S. Cl.
 CPC ................ *G01S 7/40* (2013.01); *G01S 13/42* (2013.01); *G01S 13/867* (2013.01)

(58) Field of Classification Search
 None
 See application file for complete search history.

(56) References Cited

U.S. PATENT DOCUMENTS

2007/0262275 A1 11/2007 Nelson
2012/0293355 A1 11/2012 Marianer et al.

2014/0168013 A1 6/2014 Wang et al.
2015/0285898 A1 10/2015 Testar et al.
2016/0061935 A1* 3/2016 McCloskey ........... G01S 7/4008
 342/82
2017/0315226 A1 11/2017 Bowring et al.
(Continued)

FOREIGN PATENT DOCUMENTS

CN 104637059 5/2015
CN 109061610 A * 12/2018 ........... G01S 7/4972
WO WO 2019215454 11/2019

OTHER PUBLICATIONS

Extended European search report dated Jan. 3, 2023; Application No. 22186323.6; 9 pages.
(Continued)

*Primary Examiner* — Bernarr E Gregory
(74) *Attorney, Agent, or Firm* — RANKIN, HILL & CLARK LLP; Erik J. Overberger

(57) ABSTRACT

A method of radar detection of targets in a region of interest, comprises storing boundaries of the region of interest, represented in a world reference system of coordinates. A camera fixed to the radar sensor captures an image of the environment, where a calibration object like a chessboard is identified, and based on its position in the captured image, the position and orientation of the radar sensor are determined in the world reference system. The environment is scanned, to determine target positions in a radar reference system of coordinates, centered in the radar sensor. Based on this, the target positions are transferred from the radar reference system to the world reference system, and are compared with the stored boundaries of the region of interest.

11 Claims, 2 Drawing Sheets

(56)        References Cited

U.S. PATENT DOCUMENTS

| 2021/0117659 | A1 |   | 4/2021 | Foroozan et al. |
| 2021/0124013 | A1 |   | 4/2021 | Motoyama et al. |
| 2022/0214424 | A1 | * | 7/2022 | Hu ............................ G01S 7/40 |

OTHER PUBLICATIONS

International search report dated Aug. 12, 2019; Application No. PCT/GB2019/051285; 3 pages.

* cited by examiner

TARGET DETECTION IN WORLD REFERENCE SYSTEM

FIELD OF THE INVENTION

The present invention relates to the field of radar detection, in particular for intrusion detection and for workplace safety.

BACKGROUND OF THE INVENTION

Radar sensors are known, for checking the presence of moving or still targets in regions of interest of an environment.

Commonly, the region of interest is just a portion of the field of view of the radar sensor. Thus, the radar sensors store geometric parameters of the region of interest, and compare each target position with these parameters. Accordingly, the target is determined to be inside or outside the region of interest, and the radar sensor decides to report the presence of the target or to ignore it.

Radar sensors usually detect the target position in a radar reference system centered on the radar sensor. Namely, the target position is detected in terms of range, that is the distance from the radar determined based on time of flight, and in many radar sensors also in terms of azimuth angle and/or elevation angle. In other words, the target position is usually given in polar coordinates, if in two dimensions, or in spherical coordinates, in three dimensions.

It is to be noted that, as the targets are detected in the radar reference system, also the region of interest is defined by parameters in the radar reference system. The simplest way to delimit the region of interest in such a reference system is defining maximum and minimum values for range, azimuth and/or elevation. Therefore, the region of interest, if in three dimensions, is a volume element between two portions of concentric spheric surfaces.

SUMMARY OF THE INVENTION

The Applicant perceived that it is often difficult to set appropriate geometric parameters to define the region of interest in the radar reference system. In particular, the region of interest is often conceived by the user as a region that contains some physical bodies, or that is close to a physical body. However, despite the user knows where the body is in the real world, the user may not precisely know which coordinates should locate the region of interest in the radar reference system.

Moreover, the region of interest as desired by the user may have a shape that does not well fit to the basic volume elements in spherical coordinates.

Therefore, one object of the present invention is to simplify the definition of a region of interest based on the user perception of the real world.

This and other objects are fulfilled by a method of detecting targets in a region of interest of an environment, and by a radar system, according to any one of the appended claims.

According to the invention, two reference systems are supported for determining the position of a target: a radar reference system, such as a spherical reference system, and a world reference system, such as a Cartesian reference system. The user defines the boundaries of the region of interest in the real world system, while the radar scans the environment to detect targets in the radar reference system.

An image of the environment is captured by a camera fixed to the radar sensor. A calibration object, such as a chessboard, is identified in the captured image. Preferably, the calibration object is intentionally placed in the environment, namely during a calibration phase of the radar sensor.

Then, the position of the calibration object in the captured image is used to digitally determine a position and an orientation of the radar sensor in the world reference system. Based on the position and orientation determined for the radar sensor, the position of the detected target is digitally transferred from radar reference system coordinates to world reference system coordinates.

Finally, the target position expressed in the world reference system is digitally compared with the stored boundaries of the region of interest, to check if the detected target is in the region of interest.

The invention advantageously allows the user to easily set the boundaries of the region of interest with proper knowledge of where the region is being set relative to the real world. The region is preferably defined in Cartesian coordinates, so that the region can be delimited as a parallelepiped or a composition of parallelepipeds, which is easy to adapt to most shapes of real objects.

This is achieved by a procedure that is mostly automatic, and just requires a one-time calibration with a calibration object. Algorithms for automatically identifying certain objects in an image and their position relative to the camera are already well-known, for example in the OpenCV Camera Calibration informatic library.

BRIEF DESCRIPTION OF THE DRAWINGS

The present invention will now be described in more detail hereinafter with reference to the accompanying drawings, in which embodiments of the invention are shown.

DETAILED DESCRIPTION

Figure 1:
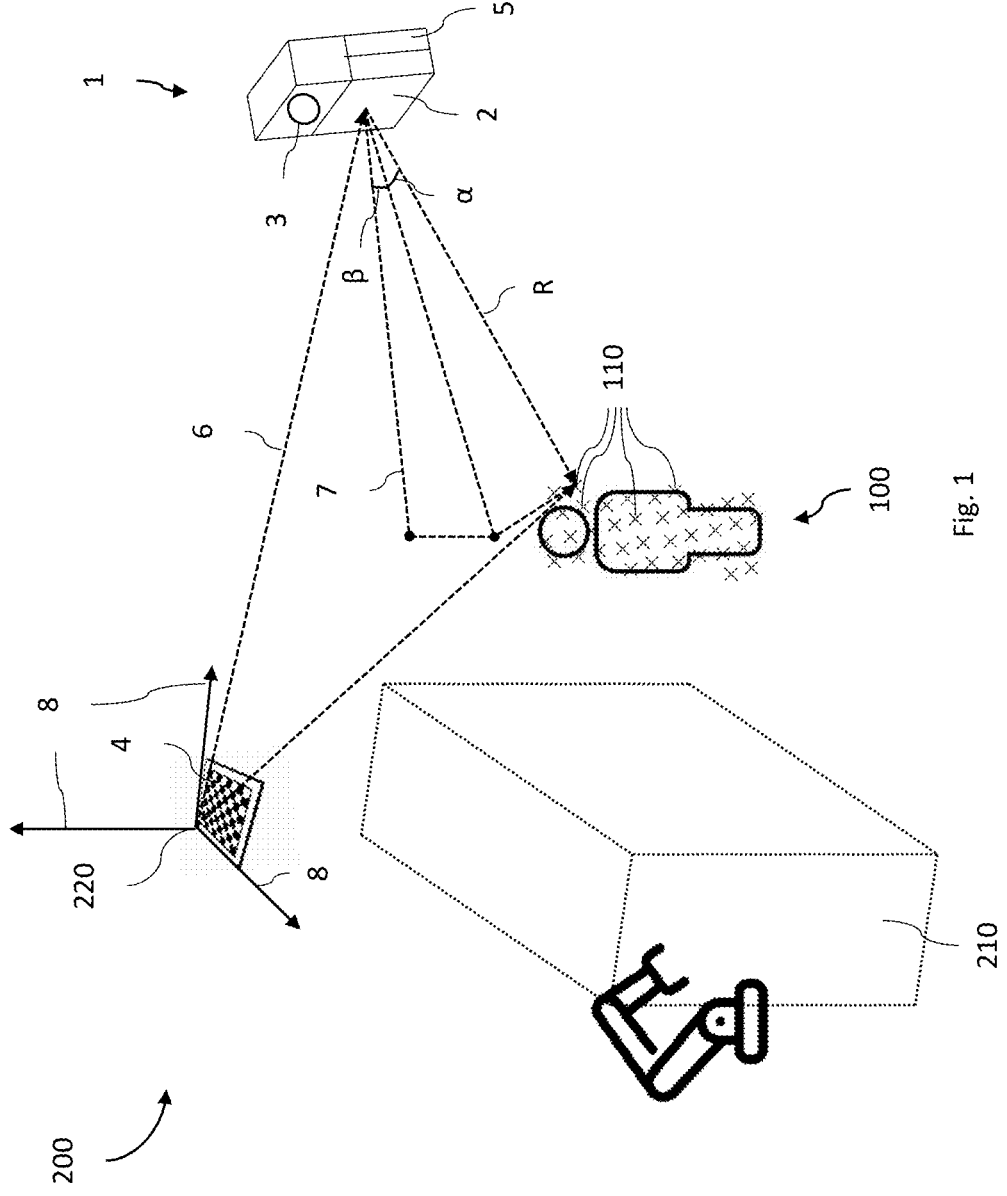
FIG. 1 is a schematic perspective view of an environment with a radar system according to one embodiment of the invention.
Figure 2:
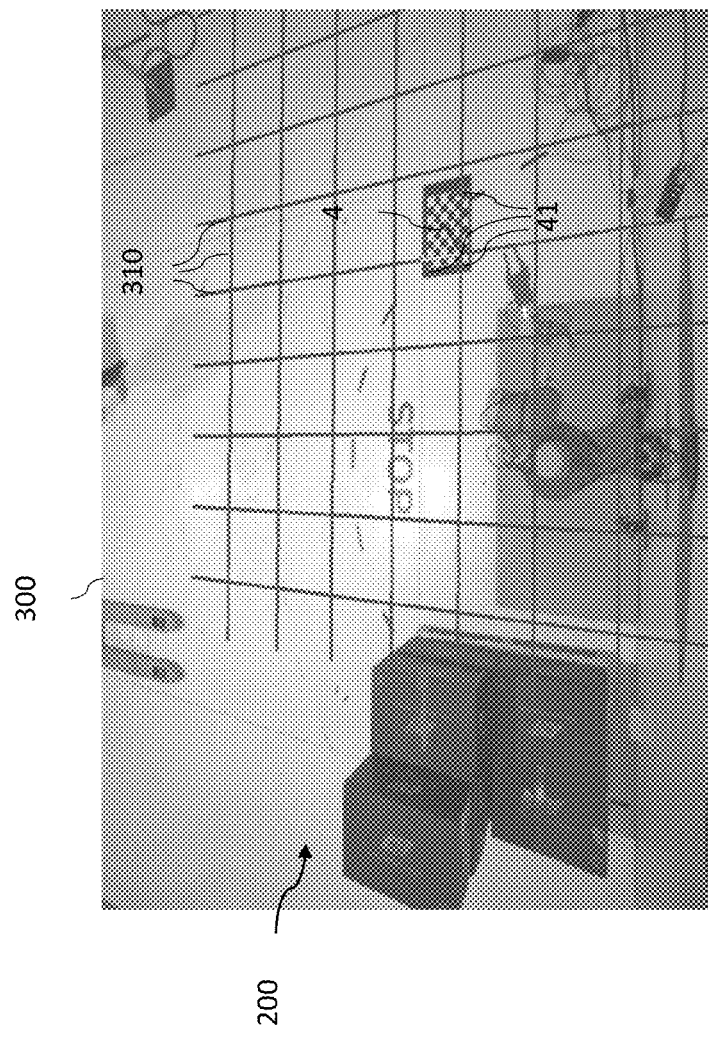
FIG. 2 is an example calibration image used for calibration of the radar system of FIG. 1.

A method of detecting targets 100 in a region of interest 210 of an environment 200 according to some embodiments of the present invention is described herein. Moreover, a radar system 1 having hardware components and software to perform the method is also described.

The system 1 comprises a radar sensor 2 arranged in the environment 200 and having a field of view. The radar sensor 2 is configured to cyclically scan the environment 200 in any known manner by transmitting radar signals in the field of view, receiving radar signals from the environment 200, reflected by targets 100 in the field of view, and processing the received radar signals. Here, the term scan is not intended to imply rotations of the radar sensor 2.

In more detail, the received radar signals are cyclically processed in any known manner so as to detect one or more targets 100 in the environment 200 and to determine one or more target positions 110 of each target 100. As usual, at first each target position 110 is determined and represented in a radar reference system of coordinates (RRS), centered in the radar sensor 2. In other words, radar reference system coordinates are determined for each target position 110.

In some embodiments, the radar sensor 2 is configured to determine each target position 110 in three dimensions. In this case, the field of view of the radar sensor 2 can be substantially shaped as a cone or a spherical sector. Preferably, the coordinated in the three dimensions include a range R, that is a distance of a portion the target 100 from the radar sensor 2. This distance can be computed based on a time of flight of the transmitted radar signal, for reaching the relevant portion of the target 100, be reflected and be received back by the radar sensor 2. In one example based on frequency modulated continuous wave (FMCW), time of flight is determined based on a frequency difference of the received signal to the transmitted signal. Alternative techniques are known to the skilled person.

Preferably, the coordinates in three dimensions also include an azimuth angle α, that is an angle of arrival of the received radar signal with respect to an ideal vertical plane. Preferably, the coordinates in three dimensions further include an elevation angle β, that is an angle of arrival of the received radar signal with respect to an ideal horizontal plane or with respect to an ideal vertical axis perpendicular to such horizontal plane. These angles can be determined in many different manners that are known to the skilled person.

It is to be noted that the horizontal and the vertical of the radar reference system are referred to the radar sensor 2, and depending on the orientation of the radar sensor 2 they may not be the same as the horizontal and the vertical for the real world. In more detail, the vertical and horizontal planes used as reference for measuring azimuth and elevation meet at a straight line defining a radar orientation 7.

It is apparent that the range R, azimuth angle α and elevation angle β define the radar reference system as a spherical reference system, where the center of the system, that is the point having coordinates (0, 0, 0) is located at the radar sensor 2.

In alternative embodiments, the radar reference system can be a cylindrical reference system, having coordinates given by range R, azimuth angle α, and a height relative to an ideal horizontal plane.

In further alternative embodiments, the radar reference system may be already a Cartesian reference system. It is to be noted that the invention is advantageous also in this case, since using a Cartesian reference system centered in the radar sensor 2 with axis oriented depending on the radar sensor orientation may not be sufficient for the user to know where certain objects of the real world are positioned in the radar reference system.

In still further embodiments, the radar sensor 2 is configured to determine each target position 110 in two dimensions. In this case, the field of view of the radar sensor 2 can be substantially planar, that is a region having a thickness that is much lower than the other dimensions, namely as a circular sector. Thus, the two dimensions may include range R and azimuth α.

In preferred embodiments, for each target 100 it is not determined only one target position 110, but each target 100 is detected as a cloud of adjacent discrete target positions 110. Each target position 110 of the cloud is a domain point of the radar reference system at which the target 100 is found to be present.

In more detail, each domain point is a set of values of coordinates of one reference system. For each domain point, a radar signal intensity is determined by processing the received signal. Therefore, the target 100 is assumed to be present at a domain point if its signal intensity is above a signal threshold.

In one aspect of the invention, the system 1 comprises a calibration camera 3 adapted to be fixed to the radar sensor 2. In one embodiment, the camera 3 and the radar sensor 2 are arranged in a common case. In other embodiments, the camera 3 and/or the radar sensor 2 comprise fixing elements (not shown) configured for removably fixing the camera 3 to the radar sensor 2. For the purposes of the preferred embodiments, it is only essential that the camera 3 is fixed to the radar sensor 2 during a calibration step. Then, the camera 3 may be removed, and optionally fixed to another radar sensor 2 to be calibrated. The calibration step can be performed once for all, or it can be periodically repeated.

As detailed below, the camera 3 is involved in determining the position of the radar sensor 2 relative to a calibration object 4, based on a captured image. Thus, it is preferred that the camera 3 is adapted to be fixed to the radar sensor 2 close to the radar sensor 2, such that their position is substantially the same. Moreover, it is preferred that the camera 3 is adapted to be fixed to the radar sensor 2 such that they have substantially the same orientation, that is the camera 3 is oriented toward the field of view of the radar sensor 2. This should apply during calibration, in particular during capture of the image by the camera 3.

In this case, the radar reference system is substantially the same as a camera reference system. In other words, range R, azimuth a and elevation 13 of a target 100 relative to the camera 3 are substantially the same as range R, azimuth a and elevation 13 of the target 100 relative to the radar sensor 2.

As mentioned above, during calibration the camera 3 is configured to capture an image 300 of the environment. After capturing the image 300, the method comprises identifying a calibration object 4 and its position in the captured image 300.

In preferred embodiments, the calibration object is identified by running a digital image recognition algorithm. In less preferred embodiments, the calibration object can be identified in the image 300 by a user, watching the image 300 on a display. Then, the user will input the position of the calibration object 4 in the image 300.

Here and below, the terms "digital" and "digitally" are intended to designate steps that are performed by computer programs and/or in computer-readable media.

It is worthwhile noting that the system 1 comprises a processing unit 5 in signal communication with the radar sensor 2 and with the calibration camera 3. The processing unit 5 may be a unit that is separate from the radar sensor 2 and the calibration camera 3, or that may be partially or fully embedded in any of them. Thus, in some embodiments the term processing unit 5 may just designate a part of the radar sensor 2 and/or of the camera 2. In the figures, the processing unit 5 is only schematically shown at a rear portion of the case of the radar sensor 2.

In particular, the radar sensor 2 and/or the camera 3 in general have some processing capability by their own. Some of the processing steps described herein for the processing unit 5 may be performed by the radar sensor 2, by the camera 3 or by a separate processing unit 5, in a substantially equivalent manner.

In one aspect of the invention, the processing unit 5 is configured to digitally determine a position 6 and an orientation 7 of the radar sensor 2 in a world reference system of coordinates, based on the position of the calibration object 4 in the captured image 300.

The world reference system (WRS) is centered in a predetermined origin point 220 of the environment 200. The world reference system is preferably a Cartesian reference system, having axes 8 with a fixed and known position and orientation relative to the environment 200. The position and orientation of these axes in particular does not vary based on the position and orientation of the radar sensor 2.

Many algorithms are already known for determining a position 6 and an orientation 7 of a camera 3 in a world reference system, based on the position of a calibration object 4 in a captured image. For example, this can be achieved by digital functions of the OpenCV Camera Calibration informatic library (CV standing for computer vision).

As commented above, the camera 3 of the invention is preferably fixed to the radar sensor 2 such that they have substantially the same position 6 and orientation 7. In this case, the known algorithms to determine the position 6 and orientation 7 of the camera 3 will return a camera position 6 and a camera orientation 7 which can also be assumed as the radar sensor position 6 and the radar sensor orientation 7. Otherwise, assuming that the relative position of the radar sensor 2 and the camera 3 fixed thereto is known, the position 6 and orientation 7 of the radar sensor 2 can be determined by a predetermined rigid movement, in terms of translation and rotation, starting from the determined position and orientation of the camera 3.

In one embodiment, based on one known example of such algorithms, the calibration object 4 has a chessboard pattern represented thereon. This allows for easy recognition of the calibration object 4. As a particular calibration object 4 is used, the calibration object is intentionally placed in a known position in the environment 200, namely on a floor 230 of the environment 200, at least during calibration.

Independently on the chessboard pattern, most algorithms require identification of three or more points of the calibration object 4. Therefore, the calibration object 4 has three or more reference details 41 adapted for identification by image recognition. For example, they can be corners of the chessboard pattern.

The determination of the position of the camera 3, and thus of the radar sensor 2, is preferably based on the (two-dimensional) positions that the three or more reference details 41 assumes in the image 300 based on perspective laws. These positions are compared with the known real (three-dimensional) positions of the reference details 41 in the world reference system.

In more detail, the real reference positions of the reference details 41 in the world reference system must be known and digitally stored in the processing unit 5. Then, after capturing the image 300, image reference positions of the reference details 41 are located in the image 300 by image recognition.

Then, the image reference positions are processed with such known algorithms, based on the stored real reference positions and on a known zoom level of the camera 3, and the position 6 and orientation 7 of the camera 3 is obtained.

The position 6 and orientation 7 of the camera 3, as well as of the radar sensor 2, are identified in six dimensions, as is known for fully determining the position and orientation of rigid bodies. Namely, the position 6 of the radar sensor 2 is defined as a vector 6 with three Cartesian coordinates. Moreover, the orientation 7 of the radar sensor 2 is defined by three additional angular coordinates, that are three radar Euler angles such as pan, tilt and roll.

In one embodiment, to simplify the algorithm for determining the radar position 6 and orientation 7, the world reference system is centered on the calibration object 4 identified by the algorithm. Thus, the predetermined origin point 220 of the world reference system is arranged at the calibration object 4. In other embodiments, the predetermined origin point 220 can be spaced, namely translated, relative to the calibration object 4. Therefore, once the position 6 and orientation 7 of the camera 3 relative to the calibration object 4 is determined, its position and orientation in the world reference system can be determined too by adding a translation and/or rotation.

In order to check that the correct position and orientation of the reference object 4 have been identified, preferably the processing unit 5 is configured to represent on a display the captured image 300 having superimposed a floor pattern 310, such as a floor grid. The floor pattern 310 is digitally construed based on the determined position 6 and orientation 7 of the radar sensor 2, in order to lay on a floor of the environment 200 where the calibration object 4 is laid.

Then, the method comprises visually checking by the user if the floor pattern 310 matches the floor of the environment 200 on the display. In case of a correct calibration, with the calibration object 4 positioned on the floor, the floor grid should be parallel to the real floor in the image 300, and the user may input a confirmation of this.

Despite the preferred embodiment involves a calibration object 4 intentionally placed in the environment 200, having predetermined reference details, other less precise algorithms are known which may take as calibration object 4 some portions of the environment 200 that already exist, and are not intentionally placed in the environment 200. For example, the floor of the environment 200 may be taken as calibration object 4. This may be performed during a single calibration step, or during cyclical operation of the radar sensor 2.

Thanks to the knowledge of the position and orientation of the radar sensor 2 in the world reference system, the processing unit 5 may digitally transfer each acquired target position 110, which was expressed in radar reference system coordinates, in order to obtain a converted target position 110 in world reference system coordinates.

In more detail, the processing unit 5 is configured to digitally determine a reference system transfer function, preferably in the form of a matrix of coefficients and optionally a bias vector of coefficients. The reference system transfer function, and in particular the coefficients of the matrix and of the bias vector, are calculated based on the position and orientation of the radar sensor 2.

The reference system transfer function is configured to transform coordinates for the radar reference system into coordinates for the world reference system. In particular, target positions 110 in the world reference system are obtained by applying the reference system transfer function on the target positions 110 in the radar reference system, preferably by a matrix-vector product, where the vector includes the coordinates in the radar reference system. If provided, the bias vector is summed to the result.

The above explains how the radar system 1 can transform the target positions 110 from the radar reference system to the world reference system. During cyclical operation of the radar system 1, any detected target 100 should be determined to be inside or outside the region of interest 210. Therefore, in a setting step, which can be performed once for all or periodically repeated, and is preferably performed at the same time as the calibration step, boundaries of the region of interest 210 are defined and digitally stored in the processing unit 5.

The boundaries can be defined by a user, and input in the processing unit 5. It is worthwhile noting that the processing unit 5 is in signal communication with a user interface, which may be built-in with the processing unit 5 or may be remote. The user interface preferably includes a display and a keyboard, or a touchscreen display, where also the image 300 and the floor pattern 310 can be displayed. For example, the user interface may be embodied as a smartphone with a proper application to communicate with the processing unit 5. Thus, the boundaries, as well as the real reference positions of the reference details 41, can be input through the user interface.

During the setting step, boundaries are defined represented as geometric boundary parameters in the world reference system. The boundary parameters in general represent lines and/or surfaces delimiting the region of interest 210. They can be for example maximum and/or minimum values for specific real world system coordinates. In another example, the boundary parameters can be parameters identifying planes delimiting the region of interest 210, with any orientation.

Finally, during cyclical operation of the radar system 1, the processing unit 5 is configured to digitally compare each target position 110, after transfer in the world reference system, with the stored boundary parameters, to check if the detected target 100 is in the region of interest 210.

Depending on other known settings and on the intended use of the radar system 1, after it is determined if a target 100 is in the region of interest 210, the radar system 1 may alert a user, for example by an alarm, or it may send the information about the target 100 being in the region of interest 210 to another control system. For example, this information may trigger a slow or stop mode for a machinery.

Moreover, despite one region of interest 210 has been described, plural regions of interest 210 may be defined. The consequences of a target 100 being in different regions of interest 210 may be the same or may be different. If the target 100 is outside any region of interest 210, it may be just ignored.

The invention claimed is:

1. A method of detecting targets in a region of interest of an environment, by means of a radar sensor arranged in the environment, comprising:

defining and digitally storing boundaries of the region of interest, that are represented as geometric boundary parameters in a world reference system of coordinates, centered in a predetermined origin point of the environment, digitally storing real reference positions of three or more reference details of a calibration object in the world reference system, capturing an image of the environment by a camera, fixed to the radar sensor, identifying the calibration object in the captured image, by locating image reference positions of the three or more reference details in the captured image, digitally determining a position and an orientation of the radar sensor in the world reference system based on a position of the calibration object in the captured image, by processing the image reference positions based on the stored real reference positions, scanning the environment by the radar sensor, to determine one or more target positions of one or more targets detected in the environment, each target position being represented in a radar reference system of coordinates, centered in the radar sensor, digitally transferring each determined target position from the radar reference system to the world reference system based on the determined position and orientation of the radar sensor, digitally comparing each target position transferred in the world reference system with the stored boundary parameters, to check if the respective detected target is in the region of interest.

2. The method of claim 1, comprising digitally determining a reference system transfer function, based on the determined position and orientation of the radar sensor, wherein the reference system transfer function is configured to transform coordinates for the radar reference system into coordinates for the world reference system, wherein the step of transferring each determined target position comprises applying the reference system transfer function on each determined target position.

3. The method of claim 1, wherein the world reference system is a Cartesian coordinate system, and the radar reference system is a polar, cylindrical or spherical reference system.

4. The method of claim 1, wherein the position and orientation of the radar sensor are determined as three radar Cartesian coordinates and three radar Euler angles.

5. The method of claim 1, wherein the calibration object has a chessboard pattern represented thereon.

6. The method of claim 1, wherein:

the world reference system is centered on the calibration object, or the predetermined origin point is spaced relative to the calibration object.

7. The method of claim 1, wherein, during capture of the image of the environment, the camera has substantially the same position and orientation as the radar sensor.

8. The method of claim 1, wherein each target is detected as a cloud of target positions with a respective radar signal intensity for each target position.

9. The method of claim 1, wherein the boundaries of the region of interest are lines and/or surfaces.

10. The method of claim 1, comprising, after determining the position and orientation of the radar sensor, and before scanning the environment:

representing on a display the captured image and a visual floor pattern superimposed to the captured image, wherein the floor pattern is digitally construed based on the determined position and orientation of the radar sensor in order to lay on a floor of the environment where the calibration object is laid, and visually checking that the floor pattern matches the floor of the environment in the image on the display.

11. A radar system comprising:

a radar sensor arranged in an environment, a calibration camera adapted to be fixed to the radar sensor, and a processing unit in signal communication with the radar sensor and the calibration camera, and with a user interface, wherein the processing unit is configured to:

receive through the user interface and store boundaries of a region of interest of the environment, the boundaries being represented as boundary parameters in a world reference system of coordinates, centered in a predetermined origin point of the environment, digitally store real reference positions of three or more reference details of a calibration object in the world reference system, command the camera to capture an image of the environment, receive from the camera the captured image and identify a calibration object in the captured image by locating image reference positions of the three or more reference details, determine a position and an orientation of the radar sensor in the world reference system based on a correspondence between the stored real reference positions and the located image reference positions of the position of the calibration object in the captured image, command the radar sensor to scan the environment, to determine one or more target positions of one or more targets detected in the environment, each target position being represented in a radar reference system of coordinates, centered in the radar senso, receive from the radar sensor each determined target position, and transfer each determined target position from the radar reference system to the world reference system based on the determined position and orientation of the radar sensor, compare each target position transferred in the world reference system with the stored boundary parameters, to check if the respective detected target is in the region of interest.

* * * * *